Patented Feb. 23, 1937

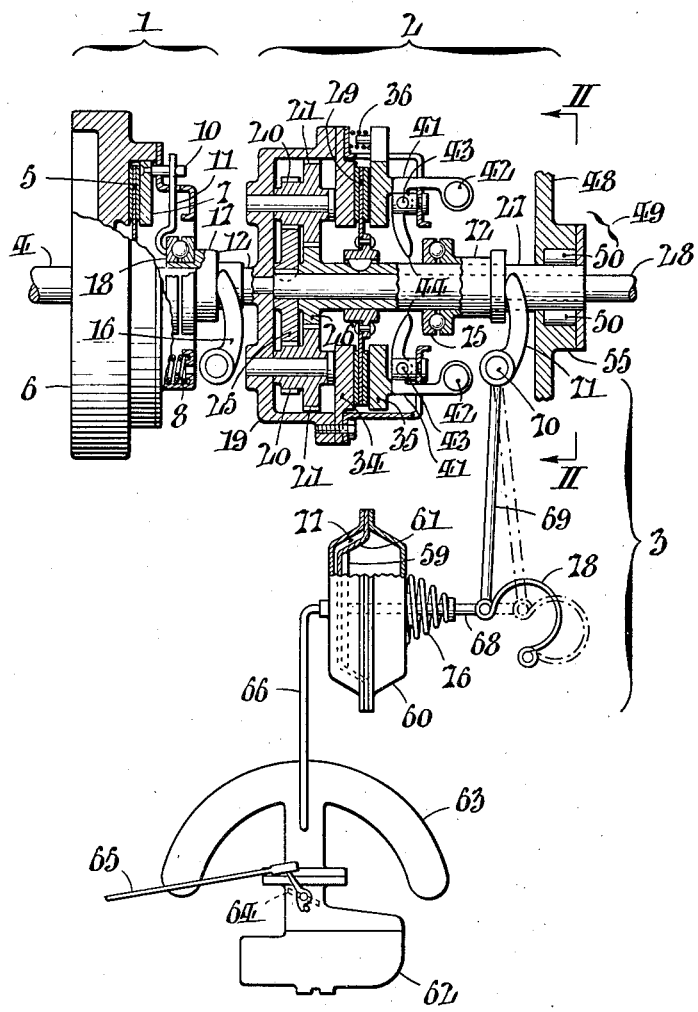

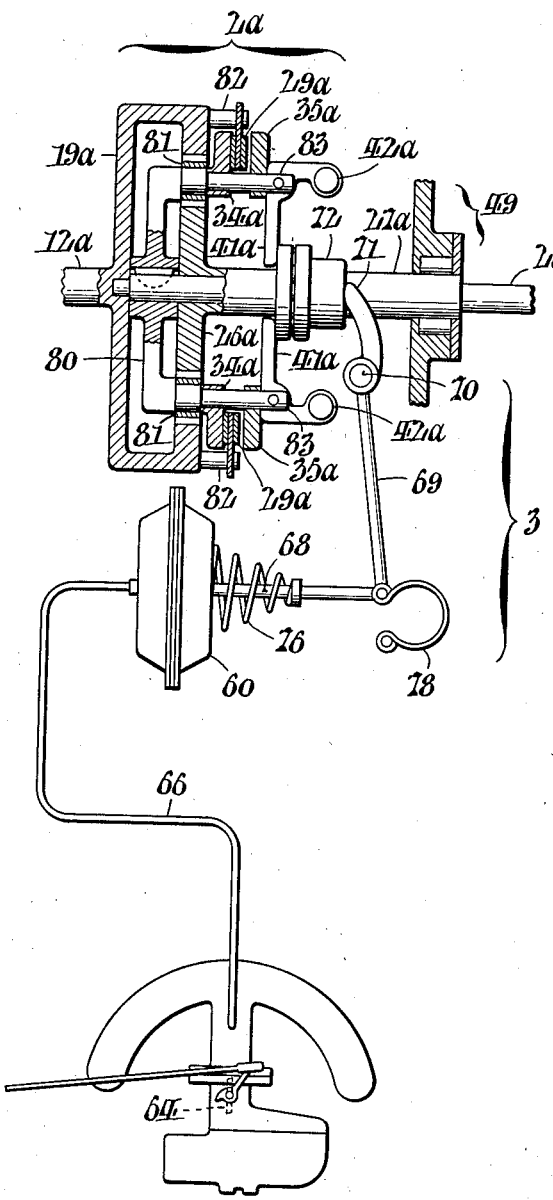

2,071,428

UNITED STATES PATENT OFFICE 2,071,428

AUTOMATIC GEAR SHIFT

David C. Prince, Swarthmore, Pa.

Application May 18, 1935, Serial No. 22,131

9 Claims. (Cl. 74—260)

My invention relates generally to automatic gear shifts, and specifically to automatic gear shifts which are actuated responsively to the tractive and power needs of the vehicle.

Heretofore it has been proposed to shift gears automatically, in accordance with the speed of the vehicle or of the prime mover. Such speed change mechanisms, however, do not take into account those situations where a change in gear ratio is desirable because of the immediate power requirements of the vehicle. For example, an automobile starting on a level or down grade with small throttle opening and proceeding at a slow speed would require a shift to the high gear as quickly as possible in spite of the slow speed. The same automobile starting with a wide open throttle in order to gain a high speed as soon as possible would require the carrying of the low gear until the engine reaches a speed above the speed for maximum power output. Thus the power requirements are of prime importance in determining whether a high or low gear is needed.

Therefore, the general object of my invention is to provide simple and efficient mechanism to effect automatic gear shifting according to the power requirements of the vehicle. Other objects include the provision of means to effect automatic gear shifting according to both the speed and power requirements, the latter factor being controlled by the throttling of the prime mover. More specifically, the gear ratio between the driving and driven shafts is determined, in the preferred form of my invention, according to the vacuum in the intake manifold of an internal combustion engine and according to the centrifugal force developed by the speed of the engine, or the speed of the propeller shaft, both factors taken together. A preferred embodiment of my invention satisfying these objects and suggesting still other advantages is described below with reference to the accompanying drawings, whereof:

Fig. I represents a side view, partly in section and partly in side elevation, of a transmission embodying my invention.

Fig. II represents a transverse section, taken along the lines II—II of Fig. I, and showing details of an overriding clutch mechanism; and Fig. III represents a view similar to Fig. I, showing a modified form of transmission embodying my invention.

The automatic gear shift illustrated in Figs. I and II of the drawings may be divided into three subordinate units for the purposes of a detailed description: a clutch mechanism, comprehensively designated at 1, for allowing the prime mover to idle; a planetary transmission, similarly designated at 2; and gear shift apparatus, designated at 3, responsive to power demands on the prime mover.

The clutch mechanism 1 connects a shaft 4, driven by the prime mover (not shown) to the planetary transmission 2; and it has the usual clutch disk 5 disposed between a fly-wheel 6 and a pressure plate 7. Springs 8 normally urge the pressure plate 7 against the clutch disk 5. The pressure plate 7 is retractable to disengage the clutch disk 5 by means of pins 10 connected to the ends of levers 11 which bear upon a clutch throw-out collar 17. The clutch throw-out collar 17 engages the levers 11 through a ball bearing face 18 to avoid wear on the ends of the levers. Movement of the clutch throw-out collar 17 is obtained by operation of the usual clutch pedal (not shown) through a swinging arm 16. The function of the clutch mechanism 1 is to disconnect the prime mover from the planetary transmission 2, so that the prime mover may idle with the vehicle at rest.

The planetary transmission 2 includes a carrier 19 mounted on an intermediate shaft 12 to which the clutch disk 5 is attached, the shaft 12 revolving with the prime mover unless the clutch mechanism 1 is disengaged. Within the carrier 19 are mounted double planetary gears 20, 21 of different sizes. These planetary gears 20, 21 mesh with two sun gears 25, 26, respectively, one of which is keyed to the driven shaft 28, and the other of which is formed integrally with a sleeve 27 fitting around the driven shaft 28. The carrier 19 is further adapted to be connected to the sleeve 27 through a clutch disk 29. The clutch 29 is disposed between an annular plate 34 affixed to the carrier 19 and a laterally movable pressure plate 35. The movable pressure plate 35 is normally maintained out of engagement with the clutch disk 29 by means of springs 36.

On the carrier 19, clutch engaging levers 41 in the form of bell cranks are pivotally mounted, each lever having associated therewith a flyweight 42 which tends to swing the same about a pivot pin 43, urging the pressure plate 35 into engagement with the clutch disk 29. The flyweights 42, under the influence of centrifugal force, tend to spread, and in doing so oppose the influence of the springs 36 and cause the pressure plate 35 to engage the clutch disk 29. The speed of the prime mover consequently determines the action of the clutch engaging levers 41.

The sleeve 27 which carries the clutch disk 29 is journaled in a casing 48 and is engaged by an overriding clutch mechanism 49. The overriding clutch mechanism 49 allows the sleeve 27 to rotate only in the direction of rotation of the driving shaft 4. The overriding clutch 49 is shown most clearly in Fig. II, and its direction of rotation is there indicated by an arrow. If a force tends to revolve the sleeve 27 in a direction opposite to that of the driving shaft 4, rollers 50 are wedged between the sleeve and a carrier ring 55, because of the curvature of the wedging faces 56. On the other hand, when the sleeve 27 revolves in the same direction as that of the driving shaft 4, the rollers 50 are urged toward the notches 57, and they serve to provide a substantially frictionless bearing.

The planetary transmission 2 through the engagement and disengagement of the clutch disk 29 provides either a direct drive between the driving shaft 4 and driven shaft 28 for high speed, or a drive through reduction gears for low speed. The low speed is obtained through the two sets of planetary gears 20, 21, with their respective sun gears 25, 26. Because of the difference in gear ratios, the sun gear 26 tends to rotate in a direction opposite to drive, but is restrained by the overriding clutch 49. Consequently, planetary gears 20, 21 now revolve about the sun gear 26, causing rotation of the gear 25 and driven shaft 28 at a reduced speed. Accordingly, when the clutch disk 29 is disengaged, the drive is effected through the gear train, and a low speed ratio is established. When the clutch disk 29 is engaged, the gear trains are frozen, and the sleeve 27 rotates in the direction of the driving shaft 4 with the parts of the transmission 2 rotating bodily, establishing a direct high speed drive for the driven shaft 28.

The third descriptive unit, the gear shift apparatus 3 which responds to the power requirements on the prime mover, is controlled by a vacuum cylinder 60 having a movable diaphragm 61 stiffened by a face plate 59. A carburetor 62 and a manifold 63 which are part of the prime mover are conventionally indicated, showing a throttle valve 64 and throttle rod 65; and to the manifold 63 is connected the vacuum cylinder 60 through a pipe 66. Attached to the diaphragm 61 and its face plate 59 is a rod 68 which in turn is pivotally attached to a lever 69. The lever 69 is fulcrumed at 70 and terminates in an arm 71. The arm 71 urges a collar 72 along the sleeve 27 and into contact with fingers 44 forming part of the clutch engaging levers 41, thus tending to overcome the centrifugal force of the fly-weights 42 and to disengage the pressure plate 35 from the clutch disk 29. The collar 72 has a ball bearing face 75 to prevent wear on the lever ends of the fingers 44. The rod 68 has associated with it a spring 76 urging it to overcome the effect of a vacuum in the vacuum chamber 77. An additional toggle spring 78 offers resistance to slight movements of the rod 68, preventing gear changes from high to low until the force is strong enough to make a definite and positive gear change. This avoids constant slipping of the clutch and tends to keep the rod 68 at one extreme of its travel or the other. The force on the diaphragm 61 from the spring 76 is computed to be less than the effective force exerted by the fly-weights 42 at speeds above the maximum power output of the prime mover. This prevents a shift into low gear at high speeds when the throttle 64 is opened wide, destroying the vacuum. The vacuum in the manifold 63 varies according to the opening and closing of the throttle valve 64, the vacuum building up as the throttle valve 64 is closed and falling as the throttle valve 64 is opened.

The apparatus herein described operates in the following manner. Upon the assumption that the vehicle is stopped and the engine running, the clutch mechanism 1 is engaged and the throttle valve 64 opened slightly. Under these conditions, a vacuum exists in the vacuum chamber 77, preventing the gear shift apparatus 3 from operating the collar 72. The engine then drives the vehicle through the planetary gears 20, 21, thus establishing the low gear ratio between the driving shaft 4 and the driven shaft 28. As the engine speed increases, centrifugal force urges the fly-weights 42 outwardly, causing the pressure plate 35 to engage the clutch disk 29, freezing the gear trains and establishing a direct drive at the high speed ratio. At this point, at low speeds, if the throttle valve 64 is opened wide to rapidly increase speed or to go up-grade, the vacuum is dissipated in the vacuum chamber 77; the spring 76 then urges the rod to the other extreme of its travel indicated in dot-and-dash lines in Fig. I, overcoming the initial pressure of the toggle spring 78. This causes the lever 69 to move the collar 72 into contact with the fingers 41. The centrifugal force of the fly-weights 42 is overcome which results in disengaging the clutch disk 29, and shifting to low gear, that is driving through the gear trains. This continues until the fly-weights 42 again engage the clutch 29, bringing about another gear shift, re-establishing the high speed ratio. When the vehicle is going at a very high speed, above the speed for maximum power output of the engine, the centrifugal force of the fly-weights 42 is sufficient to prevent shifting into the low gear when the throttle valve 64 is opened wide. As explained above, the balance of forces is predetermined to place the control in the force of the fly-weights 42 at the very high speeds where a low gear would be inappropriate. If the vehicle is now brought to a stop, the throttle valve 64 is closed, the motor slows down, and the high gear is maintained by the fly-weights 42 to a slow speed, when the clutch mechanism 1 is disengaged to allow the engine to idle. When the fly-weights 42 no longer engage the clutch disk 29, the gear is changed back to low in preparation for starting again.

In Fig. III of the drawings, there is shown a modified form of automatic gear shift of my invention in which the speed of the driven shaft, rather than the speed of the driving shaft, is a factor in operating the shifting element. The planetary transmission 2a includes an internal gear 19a mounted on an intermediate shaft 12a which may be assumed to be connected to the prime mover through a clutch mechanism of the type shown in Fig. I. Within the internal gear and keyed to the driven shaft 28, there is a spider 80 carrying planet gears 81 meshing with the internal gear 19a.

A clutch disk 29a is mounted on pins 82 attached to the internal gear 19a, and this disk 29a is disposed between an annular plate 34a carried by the spider 80 and a pressure plate 35a which is adapted to be engaged by levers 41a having fly-weights 42a thereon. The clutch engaging levers 41a are pivotally mounted on pins 83 extending outwardly from the spider 80. On the sleeve 27a there is a sun gear 26a meshing with the planet gears 81. The sleeve 27a has slidably mounted thereon a throw-out collar 72 which is urged by means of the arm 71 into engagement with the fingers 44a of the clutch engaging levers 41a.

The overriding clutch 49 and the gear shift apparatus 3 are in all respects similar to the similarly designated parts shown in Fig. I of the drawings. The parts of the gear shift apparatus 3 are shown in the positions occupied when the throttle 64 is wide open, and consequently there is no vacuum in the pipe line 66. Accordingly, the rod 68 is fully extended from the vacuum cylinder 60, under the influence of the spring 76 and the toggle spring 78. The lever 69 is thus carried to the right, and the arm 71 moved in the opposite direction to bear against the throw-out collar 72. Upon the assumption that the driven shaft 28 is rotating at a speed insufficient to urge the fly-weights 42a outwardly, the clutch disk 29a is disengaged, and accordingly the transmission is effected through the internal gear 19a, the planet gears 81 and the sun gear 26a, thus effecting the low speed ratio.

In the event that the speed of the driven shaft 28 is measurably increased, causing the fly-weights 42a under the influence of centrifugal force to be urged outwardly, the pressure plate 35a will be forced into engagement with the clutch disk 29a, causing the spider 80 to be locked to the internal gear 19a. Under these conditions, a direct drive will be established between the intermediate shaft 12a and the driven shaft 28, with the internal gear 19a and the spider 80 locked together.

It will be observed that the modified form of apparatus shown in Fig. III of the drawings is characterized by gear shift apparatus responsive to the combined factors of the throttling of the prime mover and the speed of rotation of the driven shaft, but is in other respects substantially similar in its principle of operation to the apparatus of Fig. I.

Thus my invention in a very simple manner automatically shifts the gears from high to low with a sound basis for the selection of the speed ratio. When power is needed, the low gear is brought into action; and when speed with but a small power expenditure is needed, there is an automatic shift to high gear. My automatic gear shift thus renders unnecessary the manual operation of gear shifting because the most important factors indicating a selection of speeds are automatically determined. Moreover, the structure is characterized by simplicity and ease of operation.

While I have described one particular example of apparatus embodying my invention, and its mode of operation, it will be apparent that many changes may be made in the form of the apparatus herein described and illustrated, and that certain features of the invention may at times be used to advantage without a corresponding use of other features, all without departing from the spirit of the invention as defined in the annexed claims.

Having thus described my invention, I claim:

1. In combination, a prime mover, a driving shaft, a driven shaft, power transmitting and gear changing mechanism connecting said shafts, said mechanism including a gear changing element, a carburetor associated with the prime mover, a vacuum cylinder connected to the carburetor manifold, said cylinder having a movable diaphragm, a linkage for translating the motion of the diaphragm to the gear changing element, said linkage including a toggle spring giving positive action to the gear change element, and means for urging the diaphragm in a direction overcoming the effect of a vacuum in said cylinder to cause a gear change when the vacuum is dissipated in the carburetor manifold.

2. In combination, a prime mover having a carburetor associated therewith, a driving shaft, a driven shaft, a transmission including a clutch and a gear train driving the driven shaft unless the clutch is engaged for direct drive, a collar for actuating the clutch mechanism, a lever for urging the collar to actuate the clutch mechanism, a vacuum cylinder having a movable diaphragm open to the carburetor manifold, a rod attached to the diaphragm and to said lever, and a toggle connected to the lever and rod to insure positive action of said clutch mechanism.

3. Apparatus according to claim 2 characterized by the further fact that the clutch has an additional operating means operated in accordance with the speed of the driving shaft.

4. Apparatus according to claim 2 characterized by the further fact that the clutch has an additional operating means operated in accordance with the speed of the driven shaft.

5. In combination, a prime mover having a carburetor associated therewith, a driving shaft, a driven shaft, a transmission including a clutch to cut out said transmission for direct drive, means for operating said clutch, a vacuum cylinder having a movable diaphragm open to the carburetor manifold, a rod attached to the diaphragm and to the operating means, and a toggle connected to said operating means and said rod to insure positive action of said clutch mechanism.

6. In combination, a prime mover having a carburetor associated therewith, a driving shaft, a driven shaft, a transmission including a clutch and a driving gear driving the driven shaft unless the clutch is engaged for direct drive, a spring means for urging said clutch to the disengaged position, a fly weight for overcoming said spring means to engage the clutch, a lever for opposing the force of said fly weight, a vacuum cylinder having a movable diaphragm open to the carburetor manifold, a rod attached to the diaphragm and to the lever, and a toggle connected to said lever and rod to insure positive action of said clutch mechanism.

7. In combination, a prime mover having a carburetor associated therewith, a driving shaft, a driven shaft, a transmission including a clutch and a gear train driving the driven shaft unless the clutch is engaged for direct drive, a spring means for urging said clutch to the disengaged position, a fly weight for overcoming said spring means to engage said clutch, a collar for controlling said fly weights to oppose the centrifugal force, a lever for urging the collar against said centrifugal force, a vacuum cylinder having a movable diaphragm open to the carburetor manifold, a rod attached to the diaphragm and to the lever, and a toggle connected to the lever and rod to insure positive action of said clutch mechanism.

8. In combination, a prime mover having a carburetor associated therewith, a driving shaft, a driven shaft, a transmission including a clutch and a driving-gear driving the driven shaft unless the clutch is engaged for direct drive, a collar for actuating the clutch mechanism, a lever for urging the collar to actuate the clutch mechanism, a vacuum cylinder having a movable diaphragm open to the carburetor manifold, a rod attached to the diaphragm and to the lever, a spring means urging said rod and diaphragm to overcome the effect of the vacuum, and a toggle connected to the lever and rod to insure positive action of said clutch mechanism.

9. In combination, a prime mover, a driving shaft, a driven shaft, power transmitting and automatic gear changing mechanism connecting said shafts, said mechanism including a gear train, a clutch mechanism operable to provide a direct drive between said shafts when the clutch is engaged and to provide a drive through said gear train when the clutch is disengaged, a clutch engaging element having fly-weights urged by centrifugal force according to the speed of one of said shafts to cause engagement of said clutch mechanism, fingers associated with said fly-weights operable to cause disengagement of said clutch mechanism, and means for actuating said fingers according to the throttling of the prime mover, including a collar surrounding the driven shaft, a lever having a spring means for urging said collar into contact with said fingers, said lever having no positive connection to said collar to urge the collar in the reverse direction.

DAVID C. PRINCE.